United States Patent
Loewe et al.

(10) Patent No.: US 11,712,659 B2
(45) Date of Patent: *Aug. 1, 2023

(54) METHOD FOR FILTERING A LARGE VOLUME OF A MEDIUM WITH A PRE-STERILISABLE, AT LEAST SEMI-AUTOMATED ONE-WAY FILTRATION DEVICE

(71) Applicant: SARTORIUS STEDIM BIOTECH GMBH, Goettingen (DE)

(72) Inventors: Thomas Loewe, Goettingen (DE); Bernhard Diel, Goettingen (DE); Maik Sommer, Goettingen (DE)

(73) Assignee: SARTORIUS STEDIM BIOTECH GMBH, Goettingen (DE)

( * ) Notice: Subject to any disclaimer, the term of this patent is extended or adjusted under 35 U.S.C. 154(b) by 176 days.

This patent is subject to a terminal disclaimer.

(21) Appl. No.: 16/764,440

(22) PCT Filed: Oct. 11, 2018

(86) PCT No.: PCT/EP2018/077755
§ 371 (c)(1),
(2) Date: May 15, 2020

(87) PCT Pub. No.: WO2019/096501
PCT Pub. Date: May 23, 2019

(65) Prior Publication Data
US 2020/0360859 A1   Nov. 19, 2020

(30) Foreign Application Priority Data
Nov. 16, 2017 (DE) .................... 10 2017 127 020.5

(51) Int. Cl.
*B01D 61/22* (2006.01)
*B01D 61/18* (2006.01)
(Continued)

(52) U.S. Cl.
CPC .......... *B01D 61/22* (2013.01); *B01D 29/601* (2013.01); *B01D 29/605* (2013.01);
(Continued)

(58) Field of Classification Search
CPC ........ B01D 61/22; B01D 61/18; B01D 61/20; B01D 29/601; B01D 29/605;
(Continued)

(56) References Cited

U.S. PATENT DOCUMENTS

2005/0171501 A1* 8/2005 Kelly .................... C02F 9/005
604/500
2009/0047143 A1 2/2009 Cedrone et al.
(Continued)

FOREIGN PATENT DOCUMENTS

CN        102698484 A   10/2012
DE     202017103082 U1   6/2017
(Continued)

OTHER PUBLICATIONS

International Search Report dated Jan. 2, 2019 in Application No. PCT/EP2018/077755, 3 pages.
(Continued)

*Primary Examiner* — Akash K Varma
(74) *Attorney, Agent, or Firm* — Dilworth IP, LLC

(57) ABSTRACT

A method of filtering a large volume of a medium using a pre-sterilizable, at least partially automated single-use filtration device which includes an unfiltrate inlet, a filtrate outlet, a main line running between the unfiltrate inlet and the filtrate outlet, filter elements arranged in the main line, a venting line and sensors for detecting specific process parameters and regulating means for adjusting specific process parameters, wherein the sensors and regulating means are connected to an external monitoring and control system which is adapted for evaluating and processing sensor data
(Continued)

and for piloting the regulating means based on one or more control algorithms, comprises the following process steps: a) filling the single-use filtration device with medium with low flow; b) venting the single-use filtration device through the venting line; c) closing the venting line; d) rinsing the single-use filtration device, in particular the filter elements; e) filtering the medium by means of the filter elements; f) re-rinsing with high flow; and g) closing the main line; wherein the process steps f) and g) are optional.

20 Claims, 2 Drawing Sheets

(51) Int. Cl.
- *B01D 61/20* (2006.01)
- *B01D 65/02* (2006.01)
- *B01D 29/60* (2006.01)
- *B01D 36/00* (2006.01)

(52) U.S. Cl.
CPC ......... *B01D 29/606* (2013.01); *B01D 36/001* (2013.01); *B01D 61/18* (2013.01); *B01D 61/20* (2013.01); *B01D 65/02* (2013.01); *B01D 2311/14* (2013.01); *B01D 2311/18* (2013.01); *B01D 2313/58* (2013.01); *B01D 2317/04* (2013.01)

(58) Field of Classification Search
CPC .... B01D 29/606; B01D 29/60; B01D 36/001; B01D 36/00; B01D 65/02; B01D 2311/14; B01D 2311/18; B01D 2313/58; B01D 2317/04; B01D 37/04; B01D 46/00
USPC ........................................................ 210/636
See application file for complete search history.

(56) References Cited

U.S. PATENT DOCUMENTS

| 2009/0277833 | A1 | 11/2009 | Mir et al. |
| 2010/0192686 | A1 | 8/2010 | Kamen et al. |
| 2014/0326678 | A1 | 11/2014 | Arzt et al. |
| 2017/0056825 | A1 | 3/2017 | Schwan et al. |
| 2018/0135006 | A1* | 5/2018 | Maiser ................ B01D 61/145 |

FOREIGN PATENT DOCUMENTS

| EP | 2119492 A1 * | 11/2009 | ............. B01D 61/22 |
| EP | 3012012 A1 * | 4/2016 | ............. B01D 61/22 |
| WO | 2007118235 A2 | 10/2007 | |
| WO | 2012051517 A2 | 4/2012 | |
| WO | WO 2012051517 A2 * | 4/2012 | ............. B01D 27/04 |
| WO | 2015121403 A1 | 8/2015 | |
| WO | 2016177650 A1 | 11/2016 | |
| WO | WO 2016177650 A1 * | 11/2016 | ............. B01D 15/18 |
| WO | 2017032560 A1 | 3/2017 | |

OTHER PUBLICATIONS

"New Technology of Food Industry", Zong Wei etc., Northeast Forestry University Press, Apr. 30, 2006. English Translation not Available. 3 pages.

* cited by examiner

METHOD FOR FILTERING A LARGE VOLUME OF A MEDIUM WITH A PRE-STERILISABLE, AT LEAST SEMI-AUTOMATED ONE-WAY FILTRATION DEVICE

The invention relates to a method of filtering a large volume of a medium using a pre-sterilizable, at least partially automated single-use filtration device.

BACKGROUND OF THE INVENTION

In the field of single use technology development for biopharmaceutical applications, filtration elements are becoming increasingly popular and are now used on a broad scale. In recent years, for example, single-use filtration technologies have been continuously developed and are no longer used only in the field of laboratory and of process development. Rather, single-use filtration elements are now also commonly used in commercial manufacturing processes of pharmaceutical products for the clinical phases 1 to 3 (development stages in drug development) or in the commercial production of such active substances. Single-use filtration devices currently available on the market are limited to smaller filter elements, which in turn are limited only to the pure functionality of "filtering".

Document WO 2017/032560 A1 shows a completely pre-sterilizable, integrity-testable single-use filtration device which is ready for connection and is designed for large-volume filtration processes. This single-use filtration device comprises a plurality of standard size single-use filter capsules arranged in a predetermined grid and connected to each other by lines. The filter capsules are supported by a rigid holder.

However, the issue as to the integration into automated processes has not been taken into account with previous single-use filtration elements. With the above-described entry of single-use filtration technology into commercial production, the need for automated filtration methods also increases in addition to pure scaling, i.e. the required filter size and thus the filtration area. This requires the embedding of filtration elements in hose lines, plastic tubing systems, single-use sensors and connection systems, which can then only form a holistic process solution by the connection to a suitable monitoring and control system.

SUMMARY OF THE INVENTION

In the field of single-use filtration technology, there is therefore a need for a single-use filtration device which is ready for connection and which permits a partially or fully automated filtration method, in particular on a large scale.

Furthermore, the object of the invention is to open up further cost-effective application possibilities which are based on (partially) automated single-use filtration devices designed for large volumes.

This object is achieved by a method having the features of claim 1. Advantageous and useful configurations of the method according to the invention are specified in the subclaims.

The method according to the invention of filtering a large volume of a medium is carried out using a pre-sterilizable, at least partially automated single-use filtration device. The device comprises an unfiltrate inlet, a filtrate outlet, a main line running between the unfiltrate inlet and the filtrate outlet, filter elements arranged in the main line, a venting line and sensors for detecting specific process parameters and regulating means for adjusting specific process parameters. The sensors and regulating means are connected to an external monitoring and control system which is adapted for evaluating and processing sensor data and for piloting the regulating means based on one or more control algorithms. The method according to the invention comprises the following process steps: a) filling the single-use filtration device with medium with low flow; b) venting the single-use filtration device through the venting line; c) closing the venting line; d) rinsing the single-use filtration device, in particular the filter elements; e) filtering the medium by means of the filter elements; f) re-rinsing with high flow; and g) closing the main line; wherein the process steps f) and g) are optional.

The invention is based on the findings that, depending on the degree of automation, specific components of the single-use filtration device can be dispensed with if other available data are cleverly included into the control or regulation of the process flow. In addition, the user can keep the expenditure of installation to a minimum, since the single-use filtration device can be prefabricated as a compact unit with the components required depending on the degree of automation and can be pre-sterilized. In addition to the cost savings achieved by using fewer components, both the handling of the single-use filtration device as such and the performance of the desired filtration process are thus simplified for the user.

Within the scope of a full automation with less expenditure of equipment, the presence of liquid at the filtrate outlet of the single-use filtration device can be determined from an inlet flow signal and the known system volume. A liquid detector at the filtrate outlet is then not required.

Furthermore, at least in process step e), an inlet pressure detected by an inlet pressure sensor can be used as a regulating variable. A pressure sensor at the filtrate outlet is then not required.

Furthermore, at least in process step e), the control of the flow can be carried out via a characteristic curve of a feed pump, an inlet pressure sensor and a venting liquid detector. A flow sensor is then not required.

Furthermore, at least in process step e), an inlet pressure detected by an inlet pressure sensor can be used as the regulating variable and, if necessary, a shutting-off of the main line can be carried out by a manual valve. A regulating valve at the filtrate outlet is then not required.

Furthermore, process step g) can be carried out by simply shutting off the main line by means of a shut-off valve either at the unfiltrate inlet or at the filtrate outlet. The control of the shut-off valve can be carried out via a characteristic curve of a feed pump, an inlet pressure sensor and a venting liquid detector. It is thus possible to use a simple shut-off valve instead of an input or output regulating valve if a regulation is not absolutely necessary.

Furthermore, a venting liquid detector on a housing of a sterile air filter or on a distributing or collecting pipe can be used for draining supervision and/or for air accumulation supervision. This venting liquid detector is provided in addition to or instead of a venting liquid detector on the venting line in order to achieve an earlier shutting-off of the venting line, if necessary.

Within the scope of a partial automation with less expenditure of equipment, the single-use filtration device can further comprise an inlet pressure sensor, a venting liquid detector, a controlled or regulated feed pump and a manually operated simple venting valve, wherein the process steps a), b) and c) are carried out manually and at least one of the process steps d), e) and f) is regulated in an automated manner based on an inlet pressure detected by the inlet pressure sensor and/or controlled based on a characteristic curve of a feed pump.

Furthermore, the single-use filtration device may also comprise an inlet pressure sensor, a flow sensor, a venting liquid detector, a controlled or regulated feed pump and a manually operated simple venting valve, wherein the process steps a), b) and c) are carried out manually and at least one of the process steps d), e) and f) is regulated in an automated manner based on a flow detected by the flow sensor and an inlet pressure detected by the inlet pressure sensor.

Furthermore, the single-use filtration device may also comprise an inlet pressure sensor, a flow sensor, a venting liquid detector, a controlled or regulated feed pump, an automated inlet regulating valve and a manually operated simple venting valve, wherein the process steps a), b) and c) are carried out manually and at least one of the process steps d), e) and f) is regulated in an automated manner based on a flow detected by the flow sensor and an inlet pressure detected by the inlet pressure sensor, including starting and shut-down ramps.

The single-use filtration device may also be operated in a partially automated manner with a minimum of equipment. In this case, the single-use filtration device further comprises an inlet pressure sensor, a controlled or regulated feed pump and a manually operated simple venting valve, wherein the process steps a), b) and c) are performed manually and at least one of the process steps d), e) and f) is regulated in an automated manner based on an inlet pressure detected by the inlet pressure sensor and/or controlled based on a characteristic curve of a feed pump.

The optional process step f) is preferably carried out with pressure supervision.

To extend the functionality, further components may be provided on the single-use filtration device and may be integrated into the process:

During an automated acid or base dosing, a pH sensor integrated in the single-use filtration device may be used for the automated adjustment of a pH value.

An automated actuator may be used during one or more, preferably sterile, samplings, preferably at predetermined time and/or fraction intervals.

During a pre-rinsing or wetting of the filter elements, an automated rinsing medium access can be used.

An automated drainage output or an automated gas access can be used during a rinsing or wetting medium discharge or a process run-up.

During a process supervision and/or documentation or data archiving, at least one of the following sensors integrated in the single-use filtration device can be used:—a capacitive, inductive, ultrasonic, vibration or conductive sensor for level measurement or liquid detection; a temperature sensor; a pH sensor; a conductivity sensor; a TOC sensor; a sensor for turbidity measurement.

BRIEF DESCRIPTION OF THE DRAWINGS

Further features and advantages of the invention will become apparent from the following description and from the attached drawings to which reference is made and in which.

DETAILED DESCRIPTION OF THE INVENTION

Figure 1:
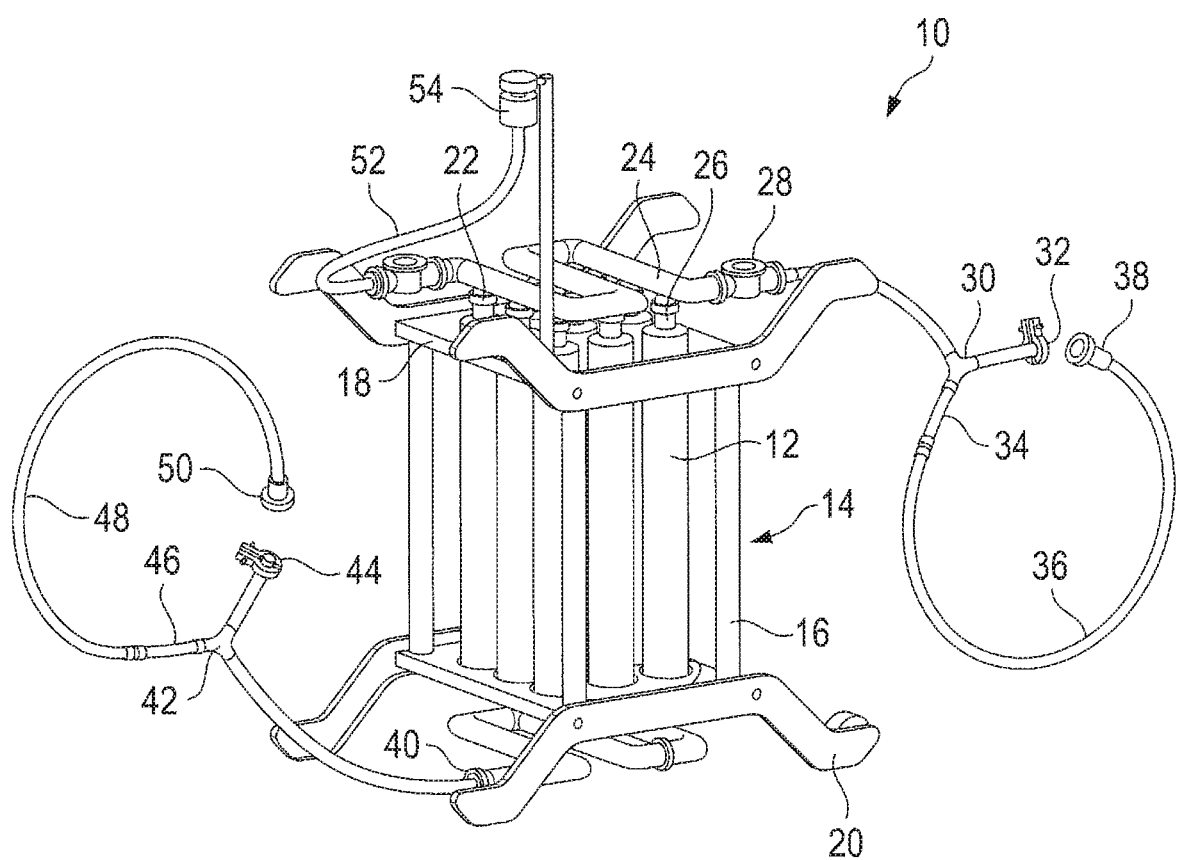
FIG. 1 shows a perspective view of a single-use filtration device with connecting lines and further connecting elements.

FIG. 1 shows by way of example a (partially) automated single-use filtration device 10 designed for large volumes, which is similar to the device known from document WO 2017/032560 A1. A plurality of filter capsules 12 are held in position in a predetermined arrangement (grid) by a rigid holder 14. The term "filter capsules" is to be understood here in general terms and is intended to designate any independently mountable assembly having one or more filter elements (membranes) installed in one or more filter units. The holder 14 comprises support posts 16 which are connected to each other by cross struts 18. Pedestals 20 ensure a secure hold of the device 10. Holding means 22 are provided on the cross struts 18 for the individual filter capsules 12. The filter capsules 12 are completely or at least for the most part connected to each other by rigid, pressure-stable pipes 24. The concrete course of the pipes 24 shown here as an example is determined by the intended operation of the filtration device (parallel or series connection of the filter capsules 12), the pipes 24 having the necessary branchings 26 to the individual filter capsules 12. If necessary, the pipes 24 are fastened to the holder 14. The essential components of the rigid holder 14, the rigid housings of the filter capsules 12 and the rigid pipes 24 are all preferably made of the same material. This material and, if necessary, other materials used in the device 10 (e.g. for any flexible hose line) are adapted to be sterilized, in particular by gamma radiation, and autoclaved. The single-use filtration device 10 may thus be sterilized in a pre-assembled, i.e. ready-for-connection state and then packed, or may be packed and then sterilized. The single-use filtration device 10 is designed for a large-volume filtration process. In particular, the filter capsules 12 altogether provide a sufficiently large filtration area for such a process.

FIG. 1 shows by way of example lines, bifurcations and connections which may be provided for the integration of specific sensors and regulating means to automate the single-use filtration device 10. An intake valve 28 is connected to an unfiltrate inlet of the rigid single-use filtration device 10 via a hose part. A bifurcation 30 is provided upstream of the intake valve 28, a tri-clamp connection 32 being provided on one line branch thereof and a reinforced intermediate hose part 34 and an inlet hose line 36 connected thereto along with a first sterile connector 38 being provided on the other line branch thereof. A filtrate outlet of the rigid single-use filtration device 10 is connected to a discharge valve 40 via a hose part. Downstream of the discharge valve 40, provision is made for a bifurcation 42, a tri-clamp connection 44 being provided on one line branch thereof and a reinforced intermediate hose part 46 and an outlet hose line 48 connected thereto along with a second sterile connector 50 being provided on the other line branch thereof. A reinforced venting line 52 leads from a venting outlet of the single-use filtration device 10 to an air filter holding means which carries a sterile air filter 54.

Figure 2:
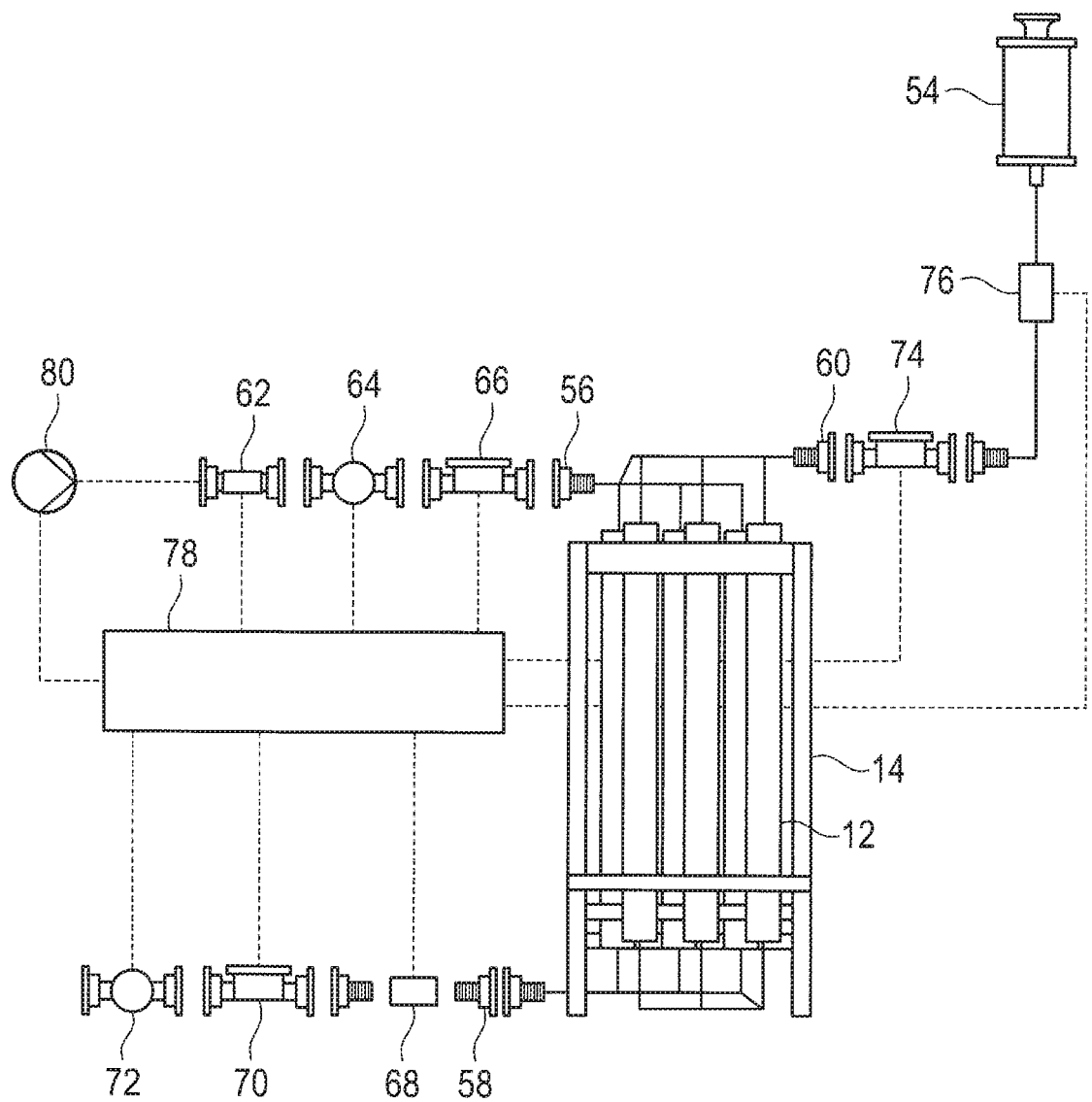
FIG. 2 shows a schematic lateral view of a (partially) automated single-use filtration device.

The integration of sensors and regulating means for the automation of the single-use filtration device 10 is explained in more detail on the basis of the example configuration of a single-use filtration device 10 shown in FIG. 2. For the sake of clarity, the components and line branches are deliberately not all shown. As already mentioned, an unfiltrate inlet 56, a filtrate outlet 58 and a venting outlet (or air inlet)

60 of the single-use filtration device 10 are each provided with (if necessary additional) hose connections for the sensors and regulating means described below, which are all designed as single-use components.

A flow sensor 62 for determining the volume flowing through per time unit, an inlet pressure sensor 64 and an inlet regulating valve 66 are provided at the unfiltrate inlet 56. An outlet liquid detector 68, an outlet regulating valve 70 and an outlet pressure sensor 72 are provided at the filtrate outlet 58. A venting regulating valve 74 and a venting liquid detector 76 are provided at the venting outlet 60.

A precondition for a complete or partial (individual process steps) automation of the single-use filtration device 10 basically consists in that the integrated sensors and regulating means are connected to a monitoring and control system 78 via electrical lines and thus enable the control of the entire process or of the respective process step. The electrical lines serve on the one hand to actuate the sensors and regulating means and on the other hand, if provided, to transmit and/or receive data or signals required for the monitoring and/or control. Alternatively, the data or signals may also be transmitted by radio. The monitoring and control system 78 is not a single-use component, but an electronic system which is located remotely from the filter capsules 12 and which contains suitable software and hardware for the evaluation and processing of sensor data and for the piloting of the regulating means based on one or more control algorithms.

In the following, various automation possibilities are described by way of example, and the components that are absolutely necessary therefor and their arrangement are explained, or the components that are just not required therefor are specified. In addition to the actual pre-sterilizable single-use filtration device 10 with the filter elements and the monitoring and control system 78, these may be individual or several components, the type and arrangement of which are shown in FIG. 2 by way of example and described above by way of example, or they involve components, the type and arrangement of which are explained in more detail in the context of the applications described below.

A) Full Automation with Less Expenditure of Equipment:

A full automation of a filtration process performed using the single-use filtration device 10 with less expenditure of equipment than a corresponding manually performed process offers the possibility to achieve the same basic function with less construction efforts, system scope and lower costs. This is particularly important when the user's installation space, control system capacity and/or financial budget are limited.

As an example of a basic function, a filtration process is assumed here which includes the following process steps: filling the single-use filtration device 10 with low flow with a simultaneous venting; closing the venting line 52; rinsing, filtration and re-rinsing with high flow in a pressure controlled manner; closing the main line (single closing, i.e. either at the inlet or at the outlet).

This basic function may be performed with only part of the equipment of the single-use filtration device 10 shown in FIG. 2, in particular without the liquid detector 68 at the filtrate outlet 58, since the presence of liquid at the filtrate outlet 58 can be determined from the inlet flow signal of the flow sensor 62 and the known system volume;

without the pressure sensor 72 at the filtrate outlet 58, since the inlet pressure is used as the regulating variable;

without the flow sensor 62, if the control of the flow is carried out via the characteristic curve of the feed pump 80, the inlet pressure sensor 64 and the venting liquid detector 76;

without the regulating valve 70 at the filtrate outlet 58, since the inlet pressure is used as the regulating variable and, if necessary, a shut-off is carried out by means of a manual valve;

use of a simple shut-off valve (only open/closed) instead of the inlet regulating valve 66 or the outlet regulating valve 70, since a regulation is not absolutely necessary and the control of the shut-off valve is carried out via the characteristic curve of the feed pump 80, the inlet pressure sensor 64 and the venting liquid detector 76;

use of a venting liquid detector on the housing of the sterile air filter 54 or on a distributing or collecting pipe serving as a common venting pipe (not shown here), in addition to or instead of the venting liquid detector 76 on the venting line 52, the venting liquid detector being simultaneously used for draining supervision and/or for air accumulation supervision in order to achieve an earlier closing of the venting line 52.

B) Partial Automation with Less Expenditure of Equipment:

A partial automation of a reduced basic function performed using the single-use filtration device 10 is possible with significantly reduced construction effort, system scope and costs compared to a purely manual procedure. In this case, the operation of the single-use filtration device 10 can be managed by only one operator. In principle, a partial automation function alone or any combination of the following equipment options is possible:

inlet pressure sensor 64, venting liquid detector 76 on the venting line 52 or on the sterile air filter 54, controlled/regulated feed pump 80, manually operated simple venting valve 74 (only open/closed). The set-up or preparation of the single-use filtration device 10 is realized manually, while the time-consuming process steps such as rinsing and filtration are regulated via the inlet pressure or controlled via the characteristic curve of the feed pump 80.

inlet pressure sensor 64, flow sensor 62, venting liquid detector 76 on the venting line 52 or on the sterile air filter 54, controlled/regulated feed pump 80, manually operated simple venting valve 74 (only open/closed). The set-up or preparation of the single-use filtration device 10 is realized manually, while the time-consuming process steps such as rinsing and filtration are regulated via the flow rate and the inlet pressure.

inlet pressure sensor 64, flow sensor 62, venting liquid detector 76 on the venting line 52 or on the sterile air filter 54, controlled/regulated feed pump 80, automated inlet regulating valve 66, manually operated simple venting valve 74 (only pen/closed). The set-up or preparation of the single-use filtration device 10 is realized manually, while the time-consuming process steps such as rinsing and filtration are regulated via the flow rate and the inlet pressure, with the possibility of regulating starting and shut-down ramps.

C) Minimum Equipment:

The basic function may also be carried out with a minimum of equipment with a maximum reduction of construction effort, system scope and reduced costs. In this case, two persons should be available for operation at least temporarily. The minimum configuration is as follows:

inlet pressure sensor 64, controlled/regulated feed pump 80, manually operated simple venting valve 74 (only open/closed). The set-up or preparation and the venting of the single-use filtration device 10 is realized manually, ideally by two persons, while the time-consuming process steps such as rinsing and filtration are regulated via the inlet pressure or controlled via the characteristic curve of the feed pump 80.

D) Extended Functionality:

To extend the functionality, additional sensors, actuators and means may be integrated into the single-use filtration device 10. The advantage is the saving of separate units or process steps and the associated equipment, space and cost savings. Examples of this are:

automated acid/base dosing using a pH sensor to adjust the pH value;

sampling, at predetermined time and/or fraction intervals (Take One), and sterile sampling (for quality control) by an automated actuator;

automated rinsing medium access (for pre-rinsing, wetting);

automated drainage output (discharge of rinsing or wetting medium, process run-up);

automated gas access (for discharging rinsing and process liquid).

E) Advanced Measurement Technology:

For a permanent process supervision and documentation/data archiving for sensitive or highly regulated or even very high-value processes, the integration of additional inline and/or online-capable sensor technology is advantageous. Examples of this are:

level measurement or liquid detection using capacitive, inductive, ultrasonic, vibration or conductive sensors. One application example is the supervision and documentation of the complete filling of all filter capsules 12 in filtration processes in which a complete use of the filter surface is necessary for the filtration function or for regulatory reasons, such as in virus filtration or depth filtration with a limitation of the surface load (filtrate quantity/filter surface) due to a breakthrough behavior.

temperature measurement using a temperature sensor. One application example is the supervision and documentation of predetermined temperature specifications for the entire process duration, e.g. in aseptic processes, which must be permanently operated in the temperature range of 2° C. to 4° C. to minimize microbiological activity, or the supervison of the temperature input by the pump application.

pH measurement using a pH sensor. One application example is the supervision and documentation in the production and filling of buffer solutions.

conductivity measurement using a suitable sensor. One application example is the supervision and documentation in the production and filling of buffer solutions, in salting-out and chromatography processes and in pre-rinsing and cleaning processes.

TOC (total organic carbon) measurement using a suitable sensor. One application example is the supervision and documentation in the production and filling of buffer solutions, in salting-out and chromatography processes and in pre-rinsing and cleaning processes.

turbidity measurement using a suitable sensor. One application example is the supervision and documentation in processes at risk of a breakthrough, such as depth or fiber pre-filtering processes.

LIST OF REFERENCE NUMERALS

10 single-use filtration device
12 filter capsule
14 holder
16 support post
18 cross strut
20 pedestal
22 holding means
24 pipe
26 branch
28 intake valve
30 bifurcation
32 tri-clamp-connection
34 intermediate hose part
36 inlet hose line
38 first sterile connector
40 discharge valve
42 bifurcation
44 tri-clamp-connection
46 intermediate hose part
48 outlet hose line
50 second sterile connector
52 venting line
54 sterile air filter
56 unfiltrate inlet
58 filtrate outlet
60 venting outlet
62 flow sensor
64 inlet pressure sensor
66 inlet (regulating) valve
68 outlet liquid detector
70 outlet (regulating) valve
72 outlet pressure sensor
74 venting (regulating) valve
76 venting liquid detector
78 monitoring and control system
80 feed pump

The invention claimed is:

1. A method of filtering a large volume of a medium in a pre-sterilizable, at least partially automated single-use filtration device, comprising the following process steps:

a) filling the at least partially automated single-use filtration device with the medium using low flow, the at least partially automated single-use filtration device including an unfiltrate inlet, a filtrate outlet, a main line running between the unfiltrate inlet and the filtrate outlet, filter elements arranged in the main line, a venting line and sensors for detecting specific process parameters relevant to a filtration process and regulating means for adjusting the specific process parameters, wherein the sensors and the regulating means are connected to an external monitoring and control system which is adapted for evaluating and processing sensor data from the sensors and for controlling the regulating means based on one or more control algorithms;

b) venting the at least partially automated single-use filtration device through the venting line;

c) closing the venting line;

d) rinsing the at least partially automated single-use filtration device including the filter elements;

e) filtering the medium using the filter elements;

f) re-rinsing the at least partially automated single-use filtration device with high flow; and g) closing the main line;

wherein the process steps f) and g) are optional, wherein at least process steps d) and e) are controlled by the external monitoring and control system for evaluating and processing the sensor data from the sensors and for controlling the regulating means based on the one or more control algorithms, wherein the sensors include a flow sensor provided at the unfiltrate inlet, an outlet liquid detector provided at the filtrate outlet, and an outlet pressure sensor provided at the filtrate outlet, and wherein the regulating means include an inlet regulating valve provided at the unfiltrate inlet and an outlet regulating valve provided at the filtrate outlet.

2. The method according to claim 1, characterized in that a presence of liquid at the filtrate outlet is determined from an inlet flow signal and a known system volume.

3. The method according to claim 1, characterized in that at least in process step e), an inlet pressure detected by an inlet pressure sensor is used as a regulating variable.

4. The method according to claim 1, characterized in that in process step e), a control of a flow occurring during the filtering of the medium using the filter elements is carried out via a characteristic curve of a feed pump, an inlet pressure sensor and a venting liquid detector.

5. The method according to claim 3, characterized in that, depending on the detected inlet pressure, a shutting-off of the main line is carried out by a manual valve.

6. The method according to claim 1, characterized in that process step g) is carried out by simply shutting off the main line using a shut-off valve either at the unfiltrate inlet or at the filtrate outlet.

7. The method according to claim 6, characterized in that a control of the shut-off valve is carried out via a characteristic curve of a feed pump, an inlet pressure sensor and a venting liquid detector.

8. The method according to claim 1, characterized in that a venting liquid detector on a housing of a sterile air filter or on a distributing or collecting pipe is used for draining supervision and/or for air accumulation supervision.

9. The method according to claim 1, characterized in that the at least partially automated single-use filtration device further comprises an inlet pressure sensor, a venting liquid detector, a controlled or regulated feed pump and a manually operated simple venting valve, wherein the process steps a), b) and c) are carried out manually and at least one of the process steps d), e) and f) is regulated in an automated manner based on an inlet pressure detected by the inlet pressure sensor and/or controlled based on a characteristic curve of the controlled or regulated feed pump.

10. The method according to claim 1, characterized in that the at least partially automated single-use filtration device further comprises an inlet pressure sensor, a flow sensor, a venting liquid detector, a controlled or regulated feed pump and a manually operated simple venting valve, wherein the process steps a), b) and c) are carried out manually and at least one of the process steps d), e) and f) is regulated in an automated manner based on a flow detected by the flow sensor and an inlet pressure detected by the inlet pressure sensor.

11. The method according to claim 1, characterized in that the at least partially automated single-use filtration device further comprises an inlet pressure sensor, a flow sensor, a venting liquid detector, a controlled or regulated feed pump, an automated inlet regulating valve, and a manually operated simple venting valve, wherein the process steps a), b) and c) are carried out manually and at least one of the process steps d), e) and f) is regulated in an automated manner based on a flow detected by the flow sensor and an inlet pressure detected by the inlet pressure sensor, including starting and shut-downs ramps.

12. The method according to claim 1, characterized in that the at least partially automated single-use filtration device further comprises an inlet pressure sensor, a controlled or a regulated feed pump and a manually operated simple venting valve, wherein the process steps a), b) and c) are carried out manually and at least one of the process steps d), e) and f) is regulated in an automated manner based on an inlet pressure detected by the inlet pressure sensor and/or is controlled based on a characteristic curve of the controlled or the regulated feed pump.

13. The method according to claim 1, characterized in that the process step f) is carried out with pressure supervision.

14. The method according to claim 1, characterized in that a pH sensor integrated in the at least partially automated single-use filtration device is used for an automated adjustment of a pH value during dosing of an acid or base.

15. The method according to claim 1, characterized in that an automated actuator is used during one or more samplings at predetermined time and/or fraction intervals.

16. The method according to claim 1, characterized in that an automated rinsing medium access is used during a pre-rinsing or wetting of the filter elements.

17. The method according to claim 1, characterized in that an automated drainage output or an automated gas access is used during a discharge of rinsing or wetting medium or of a process run-up.

18. The method according to claim 1, characterized in that at least one of the sensors integrated in the at least partially automated single-use filtration device is used during a process supervision and/or documentation or data archiving, the at least one of the sensors including:
    a capacitive, inductive, ultrasonic, vibration or conductive sensor for level measurement and/or liquid detection;
    a temperature sensor;
    a pH sensor;
    a conductivity sensor;
    a TOC sensor; or
    a sensor for turbidity measurement.

19. The method according to claim 1, further comprising a process step, before process step a), of pre-sterilizing the at least partially automated single-use filtration device.

20. The method according to claim 1, wherein the sensors further include a venting liquid detector between a venting outlet of the venting line and a sterile air filter.

* * * * *